United States Patent
Gaissmaier et al.

(10) Patent No.: US 7,197,434 B1
(45) Date of Patent: Mar. 27, 2007

(54) METHOD AND SYSTEM FOR PROCESSING GRAPHICS IN A SUPERVISORY CONTROL SYSTEM

(75) Inventors: Bernhard Gaissmaier, Uttenreuth (DE); Georg Muenzel, Plainsboro, NJ (US); George Lo, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 11/233,196

(22) Filed: Sep. 22, 2005

(51) Int. Cl.
*G06F 19/00* (2006.01)
(52) U.S. Cl. ..................................... 702/188; 700/26
(58) Field of Classification Search ................ 702/188, 702/182–183, 33–35; 714/25; 700/1, 9, 700/12, 26, 108, 110
See application file for complete search history.

(56) References Cited

U.S. PATENT DOCUMENTS

| 6,813,587 | B2 * | 11/2004 | McIntyre et al. ............ 702/183 |
| 2002/0113899 | A1 * | 8/2002 | Swan ......................... 348/607 |

\* cited by examiner

*Primary Examiner*—Edward Raymond
(74) *Attorney, Agent, or Firm*—Donald B. Paschburg; Diebl Servilla LLC

(57) ABSTRACT

A supervisory control system and display client are disclosed. The supervisory control system generates a graphical display representative of an operational status of operational components in a plant, facility or process being supervised. There are typically several types of operational components in the plant, facility or process. The system includes a server in communication with the operational components via a network. The server maintains a plurality of equipment unit objects, each of the equipment unit objects having one or more parameters representative of the operational status of the operational components. A display client is in communication with the server. The display client stores one or more equipment symbol objects, each of the one or more equipment symbol objects defining a graphical representation of one of the one or more operational components in the graphical display. The display client also stores a picture object that describes a location of each of the one or more operational components in the graphics display. The display client requests an update of the graphical display and receives equipment unit objects from the server. A processor in the display client generates the graphical display by processing the one or more equipment unit objects with the picture object and with the one or more equipment symbol objects.

17 Claims, 6 Drawing Sheets

FIG. 4
PICTURE OBJECT
40
EQUIPMENT UNIT
LIST OBJECT
42
- Tank
- Input Valve
- Output Value
- Level Sensor
- Temp. Sensor
EQUIPMENT
SYMBOL
OBJECT
44
- Tank
EQUIPMENT
SYMBOL
OBJECT
46
- Input Valve
EQUIPMENT
SYMBOL
OBJECT
48
- Sernsor
EQUIPMENT
UNIT OBJECT
50
- Input Valve
OPEN
EQUIPMENT
UNIT OBJECT
52
- Output Valve
CLOSED
EQUIPMENT
UNIT OBJECT
54
- Level Sensor
3/4
EQUIPMENT
UNIT OBJECT
56
- Temp Sensor
18C

METHOD AND SYSTEM FOR PROCESSING GRAPHICS IN A SUPERVISORY CONTROL SYSTEM

BACKGROUND OF THE INVENTION

The present invention relates to supervisory control systems and to methods and systems for processing and displaying graphics therein.

Supervisory control systems are used in the operation of plants, networks, hospitals, traffic regions as well as a large number of other facilities. By way of example only, these facilities include chemical plants and reactors. Among other functions, the supervisory control systems are used to monitor the operation and status of these facilities. In particular, the supervisory control systems generate a graphical display representative of the operational status of the facility being monitored and operators observe and control the equipment they are responsible for via operator stations using the supervisory control systems. Since the equipment units and the interrelations between them are shown in pictures, the operators are able to determine the status of the facilities by examining the graphical display.

The pictures used in the domain of supervisory control systems are characterized by the display of a large number of equipment symbols and there are typically a few types of the symbols. The straightforward application of standard graphic formats in this domain leads to inefficient solutions. This is due, in part, to the large quantity of data that must be transferred to generate the graphical display. Thus, present supervisory control systems are slow and do not allow a sufficient footprint to be generated.

These issues can lead to very serious problems. For example, supervisory control systems are generally connected to a network. If too many requests are made by different display client at different stations, then the quantity of data being transferred could overload the network, crashing the system. Additionally, if any of the processes and status being monitored are time critical, the slowness of the system can be a problem to the facility controllers.

Accordingly, new and improved methods and systems for processing and displaying information in a supervisory control system are needed.

SUMMARY OF THE INVENTION

In accordance with one aspect of the present invention, a system and a method uses of a type-instance concept while also using standard graphics formats not designed for this supervisory control systems. Thus, the present invention provides superior levels of performance and footprint, despite the utilization of standard graphics formats.

The method of the present invention generates a graphical display in a client display. The graphical display is representative of a current status of one or more operational components located in a plant, facility or process. There can be one or more types of operational components. In a first step, a request for an update of the graphical display is made by the client display from a server. The server is in communication with the one or more operational components and the server generates one or more equipment unit objects, each of the one or more equipment unit objects representing one or more current parameters of one of the one or more operational components. In response to the request, the server transmits the one or more equipment unit objects to the client display over a network.

At the client display, the graphical display is generated by processing the transmitted one or more equipment unit objects with a picture object that describes a location of each of the one or more operational components in the graphical display and with one or more equipment symbol objects, each of the one or more equipment symbol objects defining a graphical representation in the graphical display of one of the one or more types of operational components.

The method further includes displaying the graphical display. The graphical display reflects the one or more current parameters of the one or more operational components. The method further includes controlling the one or more operational components based on the graphical display.

The equipment unit objects are smaller than the picture object and the equipment symbol objects. Thus, the present invention results in an efficient generation of a graphical display of a plant, facility or process, allowing for an improved supervisory control system.

In accordance with another aspect of the present invention, the method includes generating the graphical display by processing the one or more equipment unit objects with one or more equipment graphics list objects, each of the equipment graphics list objects listing a plurality of operational components.

In accordance with a further aspect of the present invention, a supervisory control system for generating a graphical display representative of an operational status of one or more operational components is provided. The system includes a server in communication with the one or more operational components via a network, wherein the server maintains one or more equipment unit objects, each of the one or more equipment unit objects having one or more parameters representative of the operational status of the one or more operational components. The operational components are monitored and controlled by a controller. The system further includes a client display in communication with the server that displays pictures representative of the status of the operational components.

The display client stores one or more equipment symbol objects, each of the one or more equipment symbol objects defining a graphical representation of one of the one or more operational components in the graphical display, and stores a picture object that describes a location of each of the one or more operational components in the graphics display. These objects can be downloaded from the server at start up, can be stored at the display client or can be obtained during a first request for a graphical display from the server.

The display client includes a standard means for requesting an update of the graphical display and for receiving one or more equipment unit objects from the server to the display client. A processor in the display client generates the graphical display by processing the one or more equipment unit objects with the picture object and with the one or more equipment symbol objects.

In accordance with another aspect of the present invention, the server updates the one or more equipment objects based on the operational status of the one or more operational components. The graphical display reflects the one or more current parameters of the one or more operational components. The supervisory control system includes means for controlling the one or more operational components based on the graphical display.

DESCRIPTION OF THE DRAWINGS

FIGS. 3 and 4 illustrate an object model used by the supervisory control system in accordance with one aspect of the present invention.

DESCRIPTION OF A PREFERRED EMBODIMENT

Figure 1:
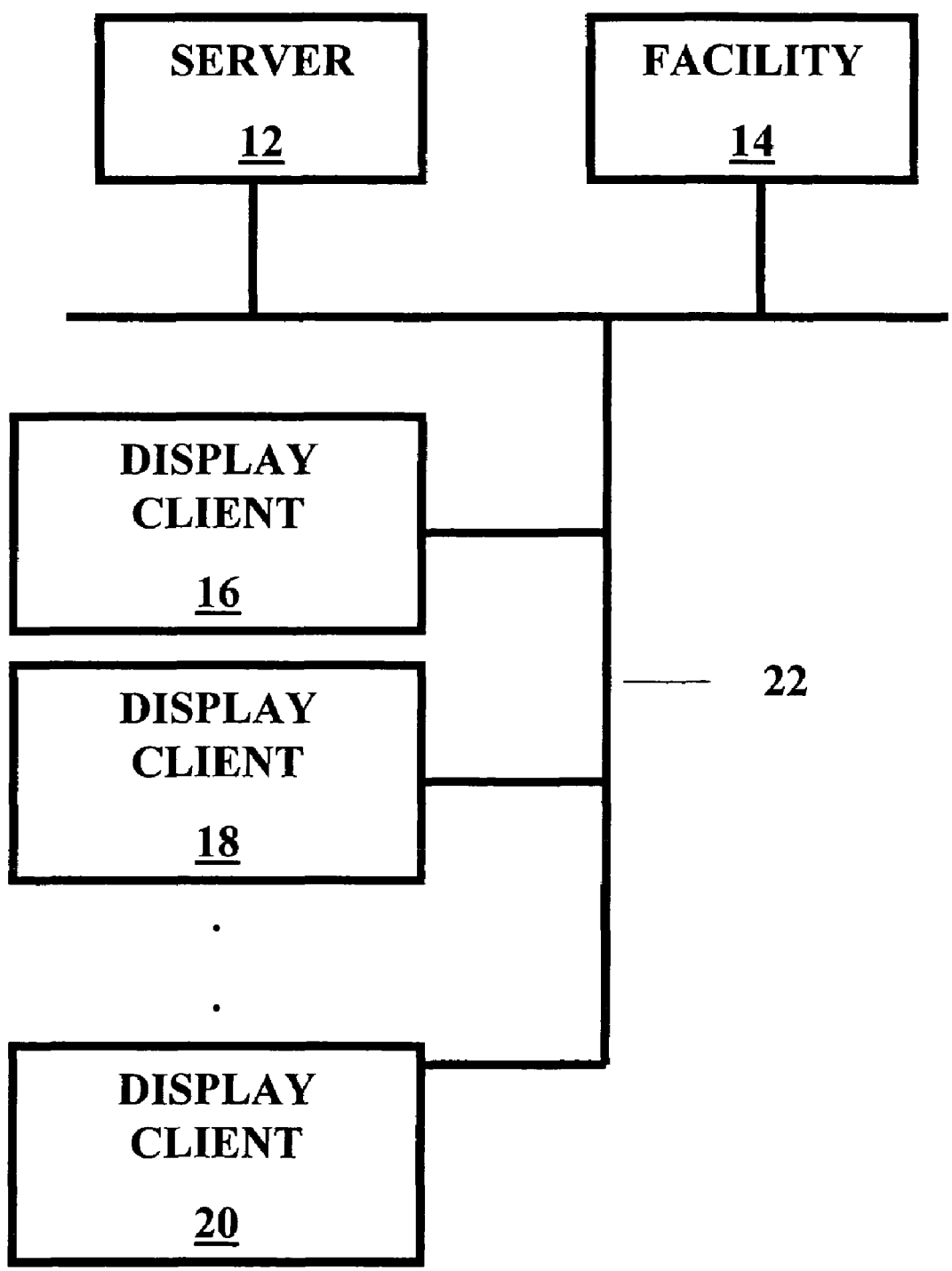
FIG. 1 illustrates a supervisory control system monitoring a chemical plant.

FIG. 1 illustrates a supervisory control system. The supervisory control system includes a server 12 monitoring a plant, facility or process 14. Various well known interface devices provide an interface from the various components of the facility 14 to the server 12. The number of interface devices depends on the number of parameters and pieces of equipment being monitored in the facility 14.

A plurality of display clients 16, 18 and 20 are in communication with the server 12 via a network 22. The display clients include supervisory control systems that can be used to display a graphical display of the facility 14 that represents the operational status of the equipment in the facility 14. Before the present invention, all of the graphical information required to display the graphical representation is transmitted from the server 12 to the requesting display client 16, 18 or 20 each time they need to generate a graphical display. If a large number of display clients request displays at the same time, the network 22 can crash. In any event, the generation of graphical displays by the display client can take a lot of time.

Any number of different types of plants or processes can be monitored by supervisory control systems. For example, chemical plants and processes, semiconductor plants and processes, and reactor facilities can be, and are, monitored with supervisory control systems.

Figure 2:
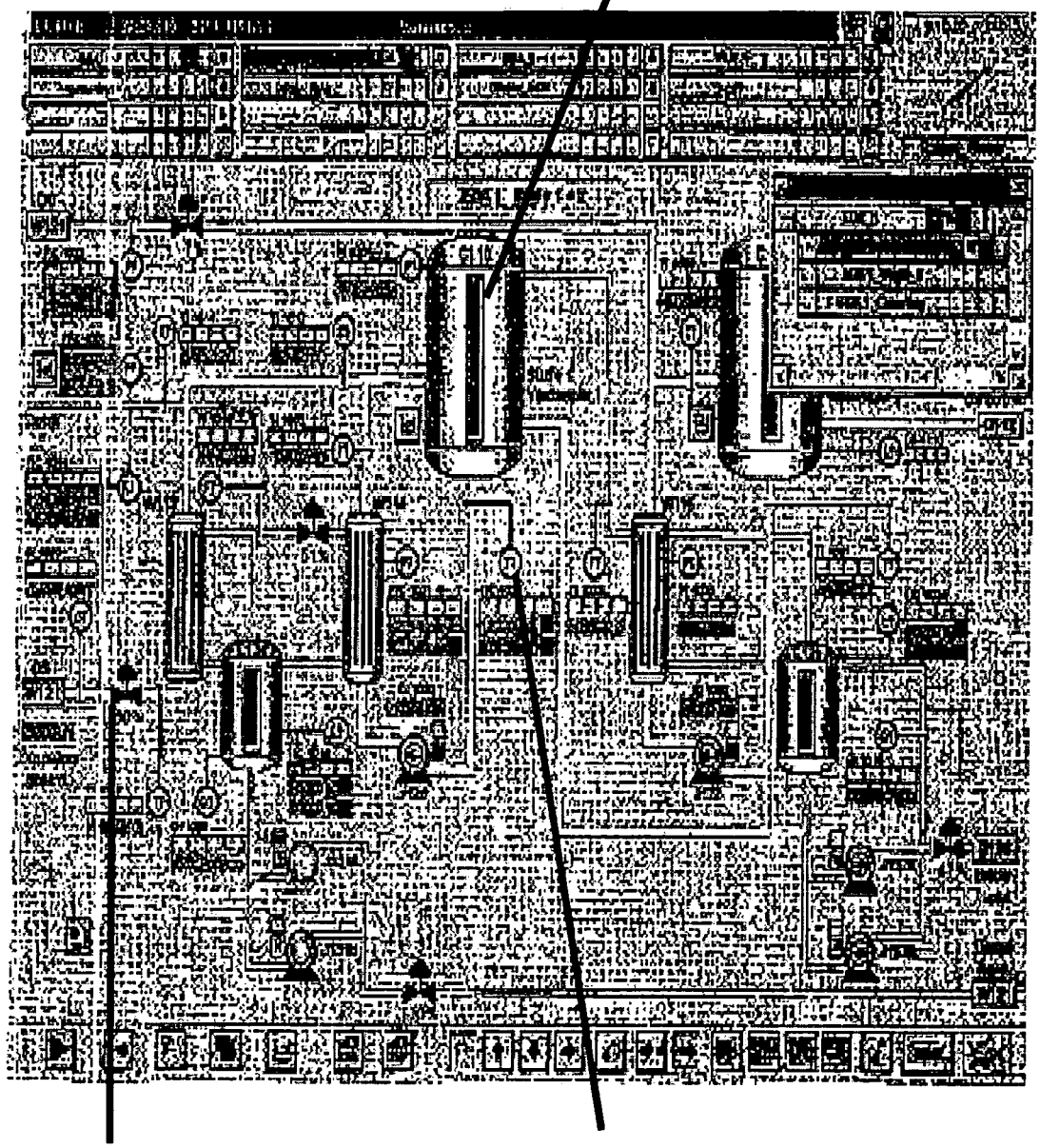
FIG. 2 illustrates one type of display that can be generated by a supervisory control system.

FIG. 2 illustrates a display generated by a supervisory control system. In this case, a typical chemical plant is illustrated. Like many chemical plants, the illustrated chemical plant includes tanks, valves and sensors. For example, tank 22, sensor 24 and valve 26 are illustrated in FIG. 2.

The picture generated by the supervisory control system consists of the graphical representations of selected equipment units in the plant or process being monitored. A typical picture shows 100 to 500 equipment units overall. The preferred style of displaying the picture is in two-dimensional schematics, although occasionally three-dimensional graphics are in use.

In FIG. 2, each equipment unit is represented by a graphical object. The complexity of the graphical object may vary. Each equipment unit in the chemical plant has a series of attributes or properties. Some of the attributes or properties may change with time. The equipment, units are of a certain type, and the graphical representation of an equipment unit is of a certain type, too. For simplicity, we assume a 1:1 relation, though occasionally this may not be the case.

Even in large plants, the number of equipment types is surprisingly restricted. Usually the number of equipment types in a large plant is in the range of 20 to 50 types. Each of the equipment types can have many different states, with each state having many different property values. Thus, in contrast to the limited number of equipment types, the number of instances can get quite large. In some cases, one thousand instances for each equipment type can often be counted.

Present supervisory control systems generate a picture with standard techniques for generating graphics. Standard techniques for generating graphics, however, do not make use of the special profile of supervisory control system pictures. Such an approach therefore will most likely result in a graphics generating system with poor performance and a big footprint.

In accordance with one aspect of the present invention, graphics are generated in a supervisory control system by exploiting the special profile of supervisory control system pictures. By doing so, superior levels of performance and storage utilization are achieved by the system and method of the present invention.

Figure 3:
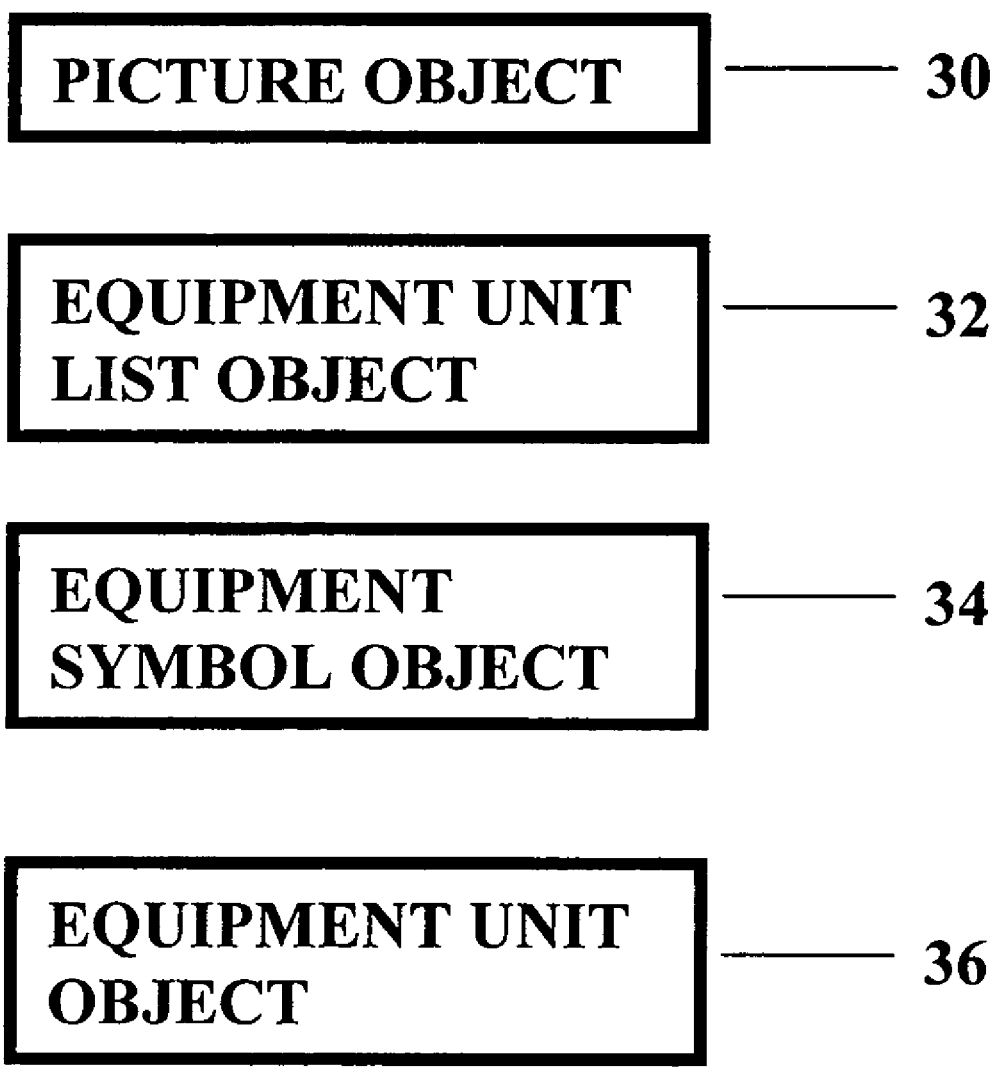

The present invention preferably uses an object model having several object types to model the plant or process. The object types used in accordance with one aspect of the present invention includes (1) an Equipment Unit object 36, (2) an Equipment Symbol object 34, (3) an Equipment Unit List object 32 and (4) a Picture object 30. These objects are illustrated in FIG. 3.

The Equipment Unit object models the real world equipment units found in the facility 14. Each Equipment Unit object has a list of attributes or properties that describe the status of various parameters of a real world equipment unit. Some of the attributes or properties will change dynamically. Some of the attributes will stem from real world processes. For example, a motor may have an Equipment Unit object that has many attributes. One such attribute may be the revolving speed of the motor which is measured by an interface device. Other attributes will be derived by formula. For example, an average value of a parameter may be derived by the supervisory control system or by the device being monitored and that average value may be an attribute in the Equipment Unit object. Thus, the supervisory control system may calculate the average (calibrated) temperature of an array of temperature sensors. Accordingly, each Equipment Unit object may have a number of different possible states representing various operational states, standby states, inactive states or malfunctioning states. Each of these different states can be represented by an instance of the Equipment Unit object.

A second object type in the object model is the Equipment Symbol. The Equipment Symbol object is the graphical representation of an equipment unit, including the graphical attributes of the graphics primitives used and the description of the outline of dynamic attributes. Any convenient graphics format could be used. For example, SVG can be used.

A third object type is an Equipment Unit List. The Equipment Unit List object lists a group of components that are associated together. For example, a tank may have an input valve, an output valve, a temperature sensor and a level sensor working in conjunction with it. The Equipment Unit List object provides a list of all equipment that may be grouped together.

A fourth object type is a Picture object. The Picture object is the container for instances of equipment representations with their positions within the picture. Thus every component in the facility 14 being monitored is represented in the Picture object and the position of each component is specified.

FIG. 4 illustrates an example of the above described object model. The object model of FIG. 4 includes a Picture object 40, an Equipment Unit List object 42, an Equipment Symbol object for a tank 44, an Equipment Symbol object for an input valve 46, an Equipment Symbol object for a sensor 48, an Equipment Unit object for an input valve 50, an Equipment Unit object for an output valve 52, an Equipment Unit object for a level sensor 54, and an Equipment Unit object for a temperature sensor 56. The object model illustrated in FIG. 4 is not complete, but is shown for illustrative purposes only.

As previously described, the Picture object 40 lists all of the components of the facility 14 that are in the graphical display by Equipment Unit object. It also specifies the location of each Equipment Unit object in the picture. The Picture object can also specify the components in the picture by Equipment Unit List object and a respective location. The object model of FIG. 4 also includes the Equipment Unit List object 42 that lists a tank, an input valve, an output value, a level sensor and a temperature sensor. These components are part of a functional group of components that will be illustrated together in the graphical display. The Equipment Symbol object 44 specifies the graphical symbol for a tank, as illustrated. The Equipment Symbol object 46 specifies the graphical symbol for an input valve, as illustrated. The Equipment Symbol object 48 specifies the graphical symbol for a sensor, as illustrated. Equipment Unit objects 50, 52, 54 and 56 specify the operational parameters of various components. Equipment Unit object 50 illustrates that the input valve is open while Equipment Unit object 52 illustrates that the output valve is closed. Equipment Unit object 54 illustrates that the tank is three quarters full and Equipment Unit object 56 illustrates that the contents of the tank are at a certain temperature.

Of course, the model of FIG. 4 is illustrative only. By way of example, each Equipment Unit object can have many different parameters. The number of parameters in each Equipment Unit object only depends on the number of parameters needed to adequately specify the operational parameters of a component of the facility 14. For example, a motor may have more parameters than a valve.

Figure 5:
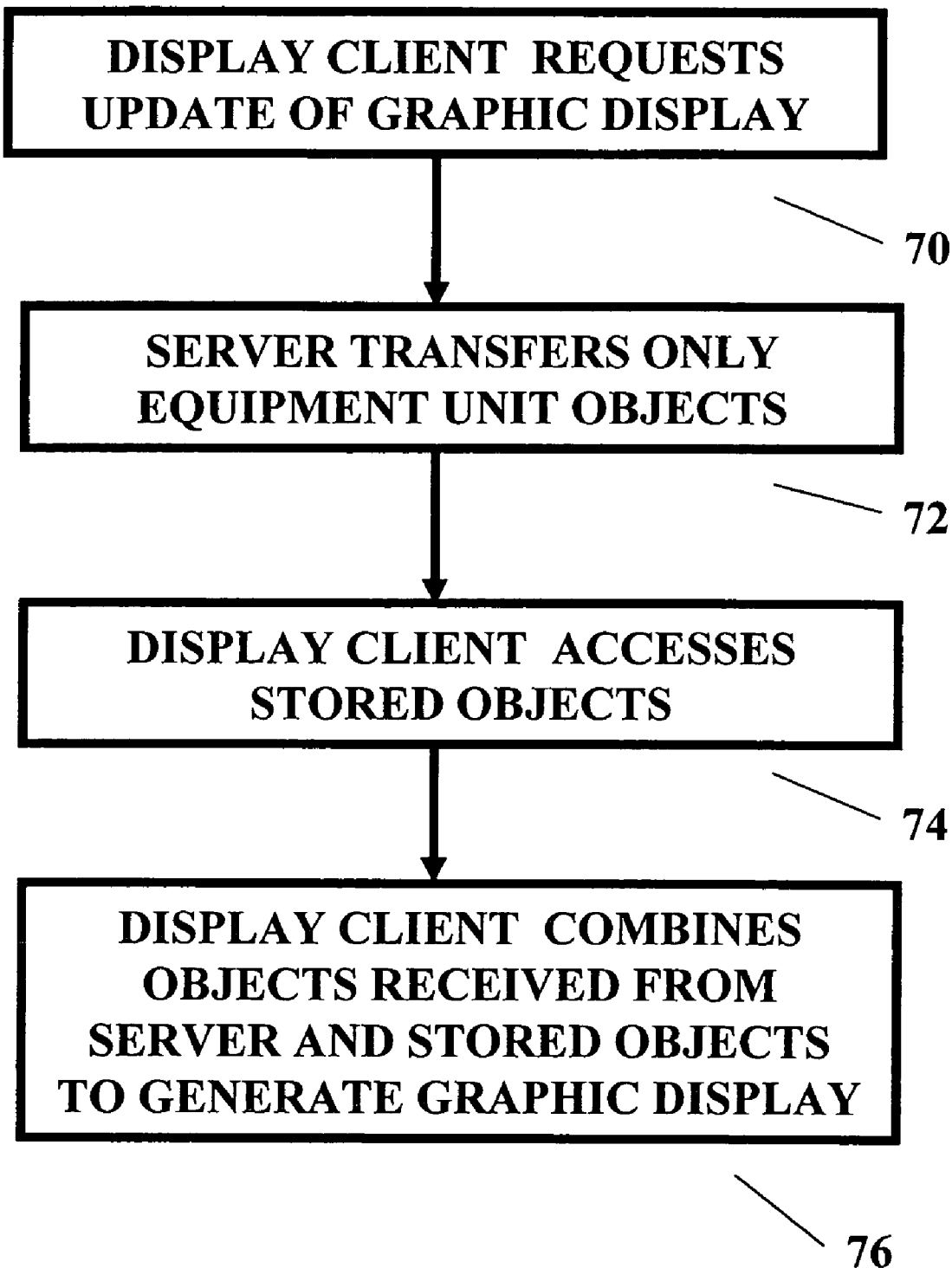
FIG. 5 illustrates the steps performed to process and generate a graphics display of a plant or facility in accordance with one aspect of the present invention.

Referring to FIG. 5, when a display client 20 wants to view a graphical representation of the operational status of the facility 14 or a part of the facility 14, the display client requests an update of the graphical display in step 70. This request is transmitted to the server 12 via the network 22. In step 72, the server 12 responds by transmitting the Equipment Unit objects corresponding to the requested graphical display via the network 22 to the display client 20. There may be many Equipment Unit objects transferred, but these objects are usually quite small compared to the Picture object and the Equipment Symbol objects, which are generally quite large due to the graphic information that must be conveyed. The server 12 does not transfer any of the other objects—the Picture object, the Equipment Symbol object and the Equipment Unit List object—as these objects are already stored at the display client 20.

In step 74, after receiving the Equipment Unit objects that specified the operational parameters of the components in the facility 14, the display client 20 accesses the stored objects. In step 76, the display client 20 combines the Equipment Unit objects received from server 12 and the stored objects to generate a graphic display. The display client 20 then displays the graphic display and the operator can control the operation of the facility accordingly.

The stored objects can be permanently stored in the display clients 16, 18 and 20. Alternatively, the stored objects can be downloaded to the display clients 16, 18 and 20 on initialization by the server 12. Also, the stored objects can be downloaded with the first request made for a graphical display, so that subsequent requests would be for an update only. The server 12 would then respond by only transmitting the Equipment Unit objects.

The display clients 16, 18 and 20 generate the graphical display by processing the received Equipment Unit objects and the stored objects. When one of the Equipment Unit objects is received, the display client accesses the stored Equipment Symbol object that corresponds to the type of component represented by the Equipment Unit object to determine the appropriate symbol to use in the graphical display. The display clients also accesses the stored Picture object to determine whether the Equipment Unit object should be in the graphical display and, if so, what its location is. The display client would also access the stored Equipment Unit List object to determine whether the component represented by the Equipment Unit object should be in the graphical display and, if so, its proper location. By processing each received Equipment Unit object in this fashion, a complete graphical display is generated by the display client.

Each Equipment Unit object transmitted by the server 12 represents one instance of the Equipment Unit object. This instance defines the current operational parameters of a component in the facility, and therefore represents the current operational status of that component. One Equipment Unit instance maybe displayed in more than one picture. Thus, more than one operator can view current operational status on different display clients.

The above model assumes that the attributes of the equipment unit instance (including the graphical attributes of the equipment unit graphics instances) do not depend on the picture container. This means that the graphics related to a certain equipment unit instances is depicted the same way in all pictures. If this assumption can not be kept a slightly more elaborate object model has to be used, but the concept itself remains unaffected. For example, if there is a picture showing parts of a plant in different scales, then different graphic symbols are needed. Thus, in the case where a picture shows an overview picture of an entire plant as well as a more detailed picture of plant areas, then different graphic symbols are needed for the different levels of detail.

Generally, the Equipment Unit objects are much smaller than the other objects. One Equipment Unit object may only be several bytes in size, whereas the Picture object and the Equipment Symbol object can be quite large due to their graphical nature. Accordingly, the present invention can result in a significant improvement in the operation of a supervisory control system.

When drawing a graphical display, it is assumed that the following data is available: the static and dynamic attributes of all instances of equipment units (ie. all Equipment Unit objects); the description of all equipment symbols (ie. the Equipment Symbol objects); the attributes of all instances of equipment unit graphics, at least those occurring in the picture to be drawn; the instance of the picture container to be drawn with all related data (especially the positions for the equipment representations).

Typical data sizes are:

100 bytes for the relevant attributes of an equipment unit instance 30 bytes for the relevant attributes of an equipment graphics Instance 1 Kbytes for the description of one equipment unit (type)

1 Kbytes for the description of one equipment unit graphics (type)

10 Kbytes for the description of one symbol 500 equipment unit Instances in one picture, based on 10 types Where the present invention is used in a client-server architecture, the data resides on the server, and the picture is shown on the screen of the client. The data, except for data relating to current operational parameters which is in an Equipment Unit object, is cached on the display client as needed, because they do not change during operation. For the example, to cache the data above, a cache of the size 50*(1+1+10)Kbytes=600 Kbytes is needed. This is really a modest request.

The present invention improves the performance of all important drawing functions substantially. The function draw is the most basic function considered. Draw will scan the picture container, thereby searching for equipment unit instances. For each equipment unit Instance (or its representation) found in a container x, the function will pick (usually from a server) the related attributes and then start to interpret the description of the symbol belonging to this equipment unit. During the interpretation, it will feed in the values of the attributes which may influence the drawing.

For the example above, if all of the data needed from the drawing were transferred from the server, as was done with prior supervisory control systems, the amount of data to be transferred from the server is approximately (30+100)*500 bytes=65 Kbytes. Therefore with today's network speeds of 10, 100 or even 1000 MBit/sec, the drawing speed should not be limited by the data throughput during drawing. This statement is true even for wireless LAN with speeds of 11 or 54 MBit/sec. Only for low speed connections (e.g. modems) the drawing performance might be slightly affected by the data throughput, but without the invention the drawing function would be unbearably slow. This data may expand to about 500*2*10 Kbytes=10 Mbytes. Thus, in a conventional approach, you would create complete pictures, which would typically need this storage of 10 Mbytes on the sewer side for each picture, so the transfer rate would have to go up by a factor of 15 to achieve good results. This severely limits the achievable drawing speed.

In a supervisory control system, some of the data shown in the pictures will change dynamically quite fast, usually within seconds. These changes may be important for the operator, therefore they have to be reflected in the picture in due time, typically within one second.

For this purpose, in accordance with one aspect of the present invention, the function redraw is used. This function requests from the server for each instance of an Equipment Unit object which is shown in the current picture, the dynamic attributes. If they have changed during the last scan, the corresponding graphics elements are refreshed, the others are intentionally left unchanged to avoid flicker.

With the approach of the present invention, the data to be transferred from the server will be in the range of 5 Kbytes (assuming that 10% of the attributes are dynamic), which will create a negligible load on the communication line. With the conventional approach, we still would have to transfer 10 Mbytes, making a fast update rate very expensive in terms of communication bandwidth and processor load. For the drawing algorithm there is further optimization possible: usually only a small fraction of the dynamic data change really change during one scan (typically less then 1%). If the drawing algorithm is confined to redraw affected graphics elements only, then the refresh should run at high speed. One could optimize even further if the symbol description is mapped to a set of commands which is supported directly by the graphics card. Most graphics cards support quite advanced command sets for vector graphics of the style needed in this domain.

Figure 6:
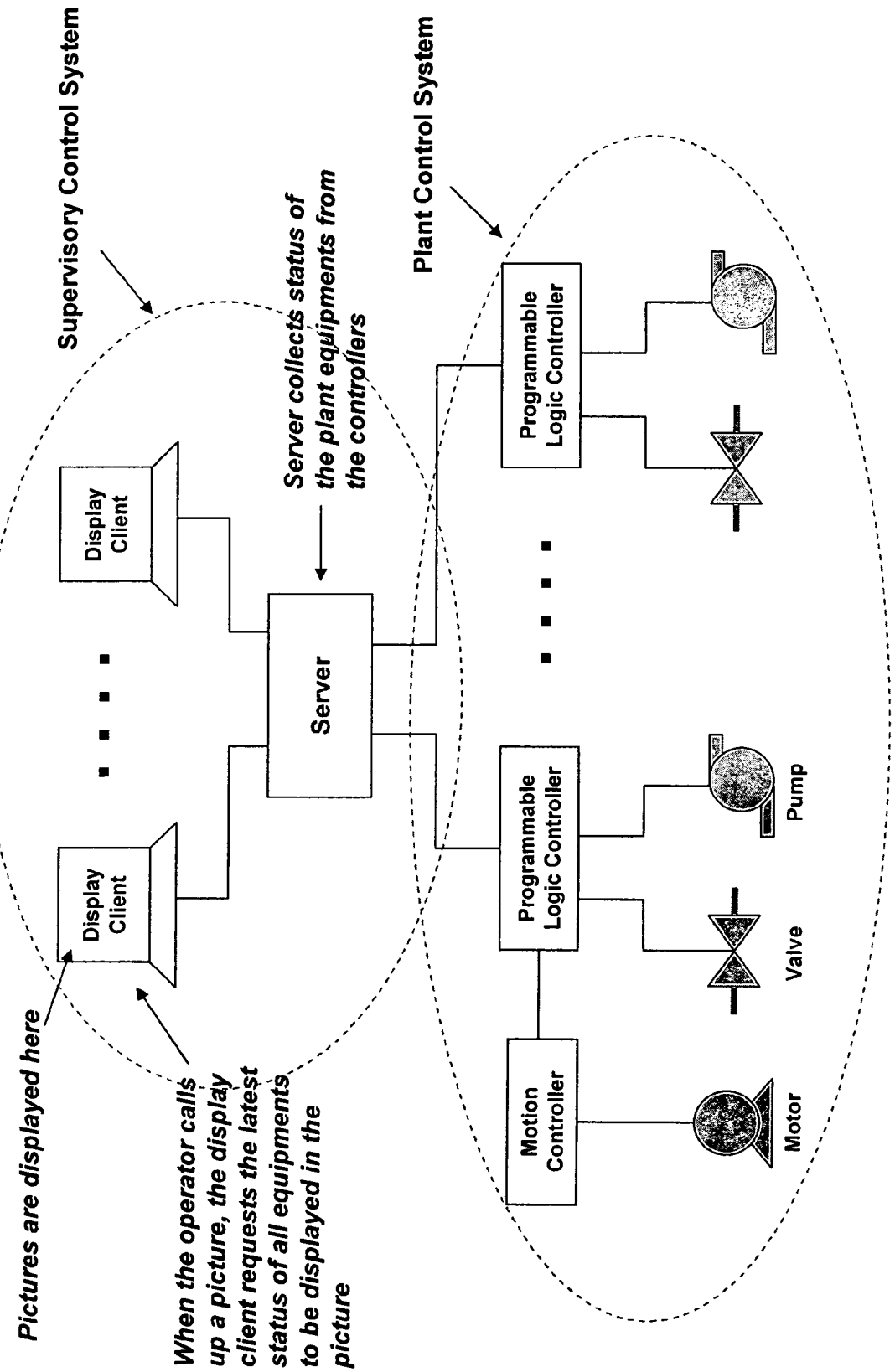
FIG. 6 illustrates an example of a supervisory control system monitoring a plurality of controllers.

To further illustrate the invention, FIG. 6 shows a supervisory control system monitoring a plurality of controllers. The controllers are typically located in the plant control system and are therefore close to the operational components. Controllers are lower in the system hierarchy. The server collects the status of the operational components being monitored by the controllers. The status is collected via the server and pictures are displayed in the Display Client in the Supervisory Control System. When the operator requests a picture, the Display Client requests the latest status of the components to be displayed in the picture.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method of generating a graphical display at a display client, the graphical display being representative of a current status of one or more operational components, there being one or more types of operational components and the graphical display being modeled with a Picture Object, one or more Equipment Unit Lists, one or more Equipment Symbols and one or more Equipment Unit Objects, wherein the Equipment Unit Objects has parameters of the one or more operational components that dynamically change, comprising:

the display client requesting an update of the graphical display from a server in communication with the one or more operational components, wherein the server generates the one or more Equipment Unit Objects that have dynamically changing parameters;

transmitting the one or more Equipment Unit Objects to the display client in response to the request; and at the display client, generating the graphical display by processing the transmitted one or more Equipment Unit Objects with a cache that stores the Picture Object, the one or more Equipment Unit Lists and the one or more Equipment Symbols.

2. The method as claimed in claim 1, further comprising displaying the graphical display, wherein the graphical display reflects the one or more current parameters of the one or more operational components.

3. The method as claimed in claim 2, further comprising controlling the one or more operational components based on the graphical display.

4. The method as claimed in claim 1, wherein the Equipment Unit Objects are smaller than the Picture Object and the Equipment Symbol Objects.

5. The method as claimed in claim 1, wherein the server tracks the one or more parameters that have changed since a last request by the display client and the Equipment Unit Object contains only the one or more parameters that have changed since the last request.

6. The method as claimed in claim 5, wherein the display client updates a displayed graphical display based only on the Equipment Unit Object.

7. The method as claimed in claim 6, whereby flicker in the displayed graphical display is minimized.

8. A supervisory control system for generating a graphical display representative of an operational status of one or more operational components, there being one or more types of operational components, comprising:
- a server in communication with the one or more operational components via a network, wherein the server maintains one or more equipment unit objects, each of the one or more equipment unit objects having one or more parameters representative of the operational status of the one or more operational components that dynamically change;
- a display client in communication with the server, the display client caching one or more equipment symbols that define a graphical representation of one of the one or more operational components in the graphical display, and caching a picture object that describes a location of each of the one or more operational components in the graphics display;
- means in the display client for requesting an update of the graphical display and for transferring one or more equipment unit objects from the server to the display client; and
- a processor in the display client for generating the graphical display by processing the one or more equipment unit objects with the picture object and with the one or more equipment symbols.

9. The supervisory control system as claimed in claim 8, wherein the picture object and the one or more equipment symbol objects are not transferred with the one or more equipment unit objects.

10. The supervisory control system as claimed in claim 8, wherein the server updates the one or more equipment objects based on the operational status of the one or more operational components.

11. The supervisory control system as claimed in claim 8, further comprising a display that displays the graphical display, wherein the graphical display reflects current parameters of the one or more operational components.

12. The supervisory control system as claimed in claim 11, further comprising means for controlling the one or more operational components based on the graphical display.

13. The supervisory control system as claimed in claim 8, wherein the equipment unit objects are smaller than the picture object and the equipment symbol objects.

14. The supervisory control system as claimed in claim 8, wherein the means for processing includes further comprising generating the graphical display by processing the one or more equipment unit objects with one or more equipment graphics list objects, each of the equipment graphics list objects listing a plurality of operational components.

15. The supervisory control system as claimed in claim 8, wherein the server tracks the one or more parameters that have changed since a last request by the display client and the equipment unit object contains only the one or more parameters that have changed since the last request.

16. The supervisory control system as claimed in claim 15, wherein the display client updates a displayed graphical display based only on the equipment unit object.

17. The supervisory control system as claimed in claim 16, whereby flicker in the displayed graphical display is minimized.

* * * * *